United States Patent [19]

Bernstein

[11] Patent Number: 5,870,709
[45] Date of Patent: Feb. 9, 1999

[54] METHOD AND APPARATUS FOR COMBINING INFORMATION FROM SPEECH SIGNALS FOR ADAPTIVE INTERACTION IN TEACHING AND TESTING

[75] Inventor: Jared C. Bernstein, Palo Alto, Calif.

[73] Assignee: Ordinate Corporation, Menlo Park, Calif.

[21] Appl. No.: 753,580

[22] Filed: Nov. 25, 1996

Related U.S. Application Data

[60] Provisional application No. 60/007,914 Dec. 4, 1995.

[51] Int. Cl.⁶ .............................. G09B 19/04; G01L 5/06
[52] U.S. Cl. ........................ 704/275; 704/270; 434/156; 434/185
[58] Field of Search .................................. 704/270, 275; 434/156, 185

[56] References Cited

U.S. PATENT DOCUMENTS

| | | | |
|---|---|---|---|
| 5,036,539 | 7/1991 | Wrench, Jr. et al. | 704/246 |
| 5,065,345 | 11/1991 | Knowles et al. | 345/302 |
| 5,255,925 | 10/1993 | Small | 463/9 |
| 5,268,990 | 12/1993 | Cohen et al. | 704/200 |
| 5,387,104 | 2/1995 | Corder | 704/270 |
| 5,393,236 | 2/1995 | Blackmer et al. | 434/169 |
| 5,458,494 | 10/1995 | Krohn et al. | 434/336 |
| 5,475,792 | 12/1995 | Standford et al. | 704/233 |
| 5,487,671 | 1/1996 | Shpiro et al. | 434/185 |
| 5,540,589 | 7/1996 | Waters | 434/156 |
| 5,634,086 | 5/1997 | Rtischev et al. | 704/270 |

FOREIGN PATENT DOCUMENTS

| | | | |
|---|---|---|---|
| WO 90/01203 | 2/1990 | WIPO | G09B 19/06 |
| WO 94/10666 | 5/1994 | WIPO | G09B 19/04 |
| WO 94/17508 | 8/1994 | WIPO | G09B 19/04 |
| WO 94/20952 | 9/1994 | WIPO | G10L 9/00 |

OTHER PUBLICATIONS

Diane Kewley–Port, "Speech Technology and Speech Training for the Hearing Impaired", *J. Acad. Rehab. Audiology*, (Monograph) vol. XXVII, pp.261–264 (1994).

John H. L. Hansen, "Analysis and compensation of speech under stress and noise for environmental robustness in speech recognition", *Speech Communication*, vol.20, pp.151–173 (1996).

Robert L. Stout, "New approaches to the design of computerized interviewing and testing systems", *Behavior Research Methods & Impementations* vol.13(4), pp.436–442 (1981).

David Thissen and Robert J. Mislevy, "Testing Algorithms," *Computerized Adaptive Testing: A Primer*, Ch.5, pp.103–135 (1990).

(List continued on next page.)

*Primary Examiner*—David R. Hudspeth
*Assistant Examiner*—Tálivaldis Ivars Smits
*Attorney, Agent, or Firm*—Blakely Sokoloff Taylor & Zafman, LLP

[57] ABSTRACT

A computer system with a speech recognition component provides a method and apparatus for instructing and evaluating the proficiency of human users in skills that can be exhibited through speaking. The computer system tracks linguistic, indexical and paralinguistic characteristics of the spoken input of users, and implements games, data access, instructional systems, and tests. The computer system combines characteristics of the spoken input automatically to select appropriate material and present it in a manner suitable for the user. In one embodiment, the computer system measures the response latency and speaking rate of the user and presents its next spoken display at an appropriate speaking rate. In other embodiments, the computer system identifies the gender and native language of the user, and combines that information with the relative accuracy of the linguistic content of the user's utterance to select and display material that may be easier or more challenging for speakers with these characteristics.

59 Claims, 6 Drawing Sheets

OTHER PUBLICATIONS

Roy C. Major, "Paragoge and degree of foreign accent in Brazilian English", *Second Language Research*, vol.2, No.1, pp.51–71 (Jun. 1986).

Roy C. Major, "English voiceless stop production by speakers of Brazilian Portuguese", *Journal of Phonetics*, vol.15, pp.197–202 (1987).

Jack Mostow et al., "A Prototype Reading Coach that Listens", *Proc. 12th Nat. Conf. Artificial Intelligence*, (AAAI–94) pp.785–792 (1994).

Jared Bernstein and Horacio Franco, "Speech Recognition by Computer", *Principles of Experimental Phonetics*, Ch.11, pp.408–434 (1996).

H. H. Stassen, G. Bomben and E. Günther, "Speech Characteristics in Depression[1]", *Psychopathology*, vol. 24, pp.88–105 (1991).

Sven Anderson and Diane Kewley–Port, "Evaluation of Speech Recognizers for Speech Training Applications", *IEEE Trans. Speech and Audio Proc.*, vol.3, No.4 pp.229–241 (Jul. 1995).

PCT International Search Report for PCT/US 96/196264.

IBM Corp. 1993, "Reading Tutor Using an Automatic Speech Recognition", *IBM Technical Disclosure Bulletin*, vol.36, No.8 pp.287–289 (Aug. 1993).

METHOD AND APPARATUS FOR COMBINING INFORMATION FROM SPEECH SIGNALS FOR ADAPTIVE INTERACTION IN TEACHING AND TESTING

This application is related to and hereby claims the priority benefit of copending Provisional Application No. 60/007,914, filed Dec. 4, 1995, now abandoned, entitled Method and Apparatus For Combined Information From Speech Signals for Adaptive Interaction in Teaching and Testing, by Jared C. Bernstein.

BACKGROUND

1. Field of the Invention

The area of the present invention relates generally to interactive language proficiency testing systems using speech recognition and, more particularly, to such systems which track the linguistic, indexical and paralinguistic characteristics of spoken inputs.

2. Background Art

Many computer systems support a function whereby a human user may exert control over the system through spoken language. These systems often perform speech recognition with reference to a language model that includes a rejection path for utterances that are beyond the scope of the application as designed. The speech recognition component of the application, therefore, either returns the best match within the language model designed for the application, or it rejects the speech signal. A good description of a variety of systems which incorporate such methods can be found in "Readings in Speech Recognition," edited by Alex Waibel and Kai-Fu Lee (1990).

Computer assisted language learning (CALL) systems for second language instruction have been improved by the introduction of speech recognition. Bernstein & Franco, ("Speech Recognition by Computer," *Principles of Experimental Phonetics*, Ch. 11, pp. 408–434, 1996)and the references therein show some examples. In most cases, the speech recognition component of the CALL system has been used as best match (with rejection) or as a scored performance for testing and skill refinement, either for non-native speakers of the target language or for hearing-impaired speakers.

Prior laboratory demonstration systems have been designed to offer instruction in reading in the user's native language. Two systems have emulated selected aspects of the interaction of a reading instructor while the human user reads a displayed text aloud. One system based its spoken displays on the running average of poor pronunciations by the reader (See, e.g., WO 94/20952 by Rtischev, Bernstein, and Chen), and the other system developed models of common false starts, and based its spoken displays on the recognition of the occurrence of these linguistic elements. (See J. Mostow et al., "A Prototype Reading Coach that Listens," *Proc. 12th Nat. Conf. Artificial Intelligence, AAAI-94*, pp. 785–792, 1994)

Expert teachers and other human interlocutors are sensitive not only to the linguistic content of a person's speech, but to other apparent characteristics of the speaker and the speech signal. The prior art includes systems that respond differentially depending on the linguistic content of speech signals. Prior art systems have also extracted indexical information like speaker identity or speaker gender, and calculated pronunciation scores or speaking rates in reading. However, these extra-linguistic elements of human speech signals have not been combined with the linguistic content to estimate the global proficiency of a human user in a spoken skill in order to estimate the human user's skill level and thus to control the operation of the computer system in a manner appropriate to the human user's global skill level. Such control of computer-based graphic and audio displays is useful and desirable in order to facilitate fine-grained adaptation to the cognitive, verbal and vocal skills of the human user.

SUMMARY OF THE INVENTION

According to one embodiment of the present invention, computer systems that interact with human users via spoken language are improved by the combined use of linguistic and extra-linguistic information manifest in the speech of the human user. The present invention extracts linguistic content, speaker state, speaker identity, vocal reaction time, rate of speech, fluency, pronunciation skill, native language, and other linguistic, indexical, or paralinguistic information from an incoming speech signal. The user produces a speech signal in the context of a computer-produced display that is conventionally interpreted by the user as a request for information, or a request to read or repeat a word, phrase, sentence, or larger linguistic unit, or a request to complete, fill in, or identify missing elements in graphic or verbal aggregates (e.g., pictures or paragraphs), or an example to imitate, or any similar graphical or verbal presentation that conventionally serves as a prompt to speak. The display is presented though a device either integral or peripheral to a computer system, such as a local or remote video display terminal or telephone. The extracted linguistic and extra-linguistic information is combined in order to differentially select subsequent computer output for the purpose of amusement, instruction, or evaluation of that person by means of computer-human interaction.

Combining the linguistic and extra-linguistic sources of information in a speech signal to select the next audio or graphic display simulates the integrative judgment of a skilled tutor or other interlocutor. The benefits in language instruction and language testing are direct in that language proficiency is a combination of linguistic and extra-linguistic skills, but use of the invention in any content area (e.g., arithmetic or geography) could be advantageous. Synthesis of corresponding indexical, paralinguistic and linguistic information in the speech displays produced by the computer system facilitates communication in the same context.

DETAILED DESCRIPTION

Referring to the drawings in detail wherein like numerals designate like parts and components, the following description sets forth numerous specific details in order to provide a thorough understanding of the present invention. However, after reviewing this specification, it will be apparent to those skilled in the art that the present invention may be practiced without these specific details. In other instances, well known structures, techniques and devices have not been described in detail in order to not unnecessarily obscure the present invention.

Figure 1:
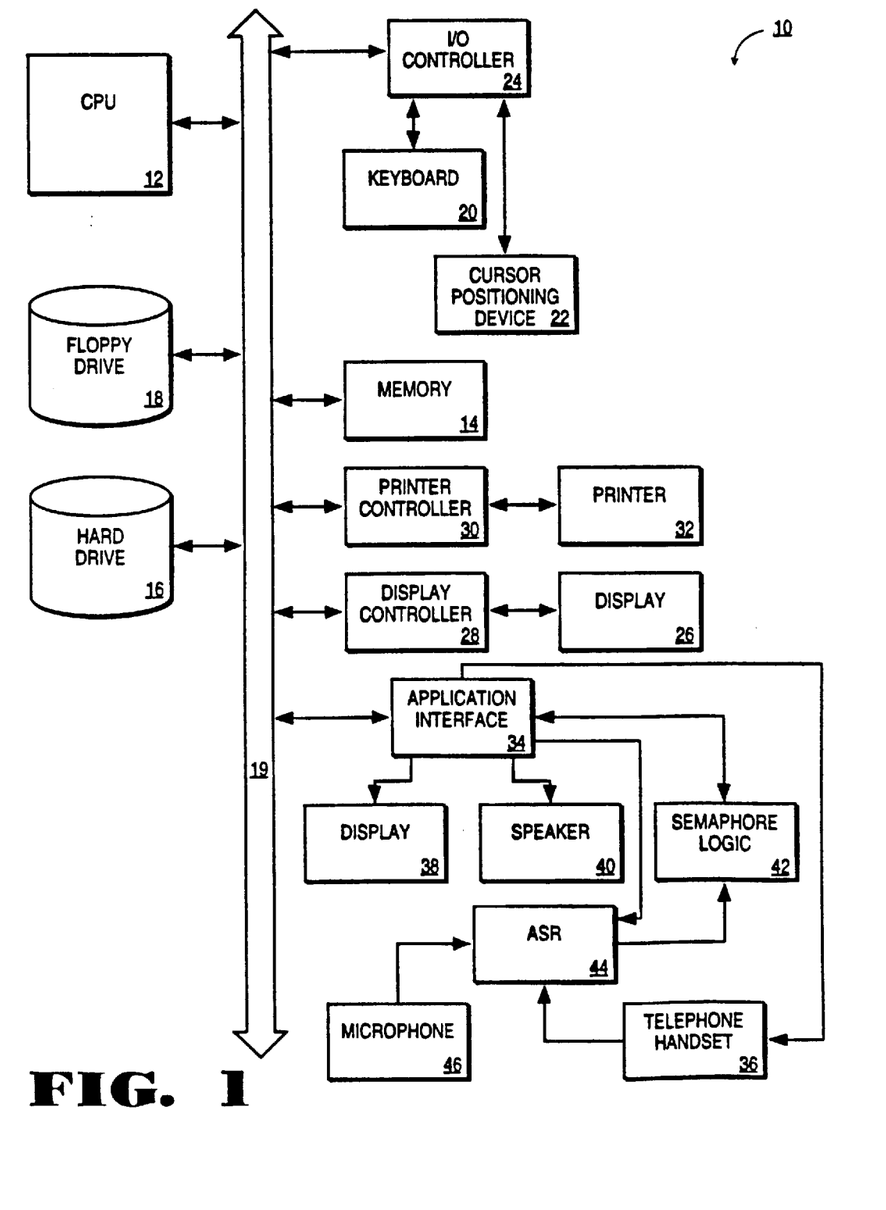
FIG. 1 illustrates a computer system which serves as an exemplary platform for the apparatus and methods of the present invention.

FIG. 1 illustrates a computer system 10 implementing the apparatus and methods of the present invention. Although the present invention can be used with any number of integrated or stand-alone systems or devices, computer system 10 represents one preferred embodiment of the platform for the present invention.

As shown in FIG. 1, computer system 10 comprises a host CPU 12, memory 14, hard disk drive 16, and floppy disk drive 18, all of which are coupled together via system bus 19. Upon review of this specification, it will be appreciated that some or all of these components can be eliminated from various embodiments of the present invention. It will further be appreciated that operating system software and other software needed for the operation of computer system 10 will be loaded into main memory 14 from either hard disk drive 16 or floppy disk drive 18 upon power up. It will be appreciated that some of the code to be executed by CPU 12 on power up is stored in a ROM or other non-volatile storage device.

Computer system 10 is further equipped with a conventional keyboard 20 and a cursor positioning device 22. In one embodiment, cursor positioning device 22 includes a trackball and two switches which are actuated by two contoured buttons. Keyboard 22 and cursor positioning device 13 comprise part of the user interface of computer system 10 and allow a user to communicate with the other elements of computer system 10. Although any keyboard 20 and cursor positioning device 22 could be used with computer system 10, in one embodiment, these items are distinct units which are coupled to the system bus 19 via input/output controller 24. Other embodiments may eliminate the input/output controller and may further integrate keyboard 20 and cursor positioning device 22 into a single unit.

Computer system 10 further includes a display unit 26 which is coupled to the system bus 19 through display controller 28. Display 26 may comprise any one of a number of familiar display devices any may be a liquid crystal display unit or video display terminal. It will be appreciated by those skilled in the art, however, that in other embodiments, display 26 can be any one of a number of other display devices. Display controller 28, which typically includes video memory (not shown), receives command and data information via system bus 19 and then provides the necessary signals to display 26, thereby accomplishing the display of text, graphical and other information to the user. When computer system 10 is in use, menus and other input/output displays which comprise part of the user interface of the computer system 10 are displayed on display 26 and an associated cursor can be moved on the screen using cursor positioning device 22 in the familiar fashion.

The printer functions of computer system 10 are implemented via printer controller 30 and printer 32. Printer controller 30 is coupled to system bus 19, thereby allowing for the transfer of command and data information. Printer 32 is coupled to printer controller 30 in the familiar fashion. It will be appreciated that some embodiments of computer system 10 will not utilize printer controller 30 and printer 32.

Application interface unit 34 is coupled to system bus 19 and acts as an interface between telephone handset 36, display 38 and speaker 40 and the system bus 19. Application interface unit 34 is further coupled to semaphore logic 42 which, in turn, is coupled to automatic speech recognizer (ASR) 44. Microphone 46 and telephone handset 36 are coupled to ASR 44. In operation, voice signals are converted to electrical signals by either microphone 46 or telephone handset 36. The electrical signals are then digitized and analyzed by ASR 44 in accordance with the methods of the present invention as described in detail below. The output signals of ASR 44 are passed to semaphore logic 42 which extracts values associated with the signals. These values are presented to application interface unit 34 for further processing as described below. Results of the processing are presented via display 38 and/or speaker 40 and telephone handset 36. It will be appreciated that in some embodiments display 38 and display 26 may comprise the same unit. In other embodiments, display 38 may be a dedicated unit.

Although application interface unit 34 has been depicted as a separate unit, upon review of this specification it will be apparent to those skilled in the art that the functions of application unit 34 may be implemented via host CPU 12.

Having thus described the overall computer system 10, the description will now turn to the particular methods and apparatus which comprise the present invention. Although in the description which follows, details of the implementation may be referred to as being in software, hardware alternatives may also be used, and vice-versa.

Computer systems that support spoken language interaction are based on speech recognition systems integrated with an application interface logic and other components such as data bases and peripherals. Computer system 10 shown in FIG. 1, is such a system. Three principal components of computer system 10: the automatic speech recognizer 44, the semaphore logic 42, and the application interface controller 34 are shown in further detail in FIG. 2. These components are directly or indirectly connected to three transducers: a video display terminal (VDT) 38, a loudspeaker 40, and a microphone 46. It will be appreciated that in other embodiments, VDT 38 may comprise an alternative type of display device such as a liquid crystal display. The components and transducers are connected by logical data streams, 50–58. The embodiment shown in FIG. 2 resembles a system in which a user interacts at a console with a VDT, microphone and a loudspeaker. However, the microphone and speaker in FIG. 2 could both be replaced by a telephone handset 36.

Figure 2:
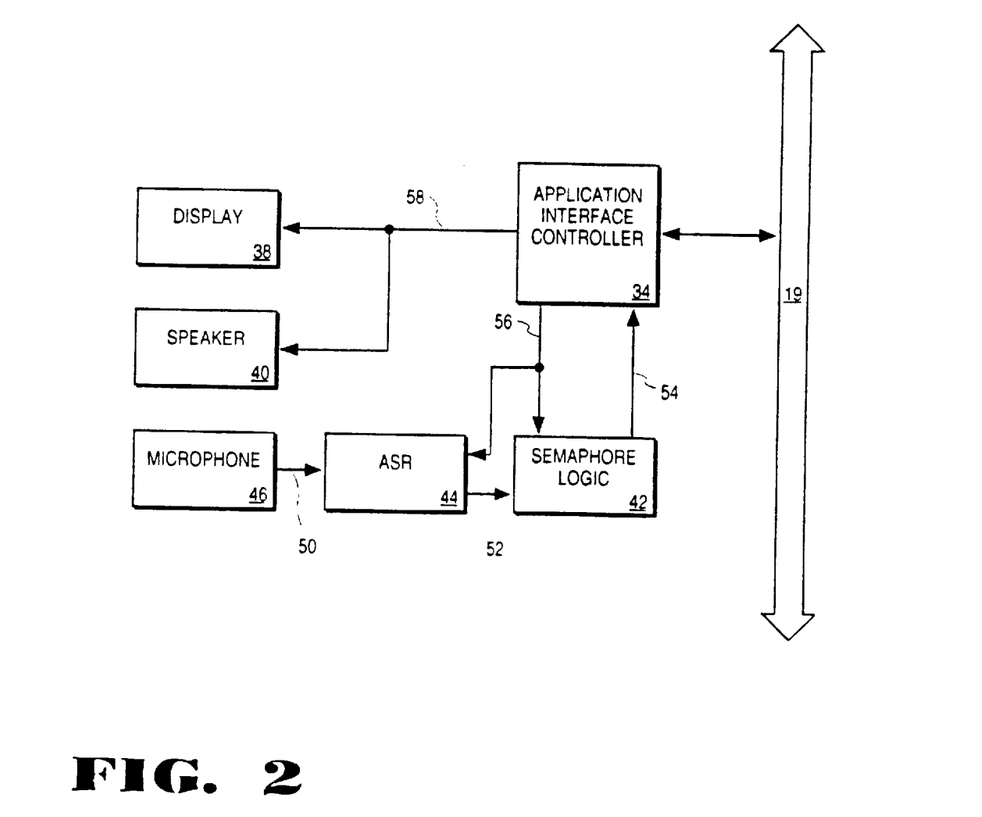
FIG. 2 illustrates the transducers and the component subsystems for speech recognition, semaphore construction, and application interface control according to one embodiment of the present invention.

A language proficiency testing system that operates over the telephone is one embodiment of the invention shown in FIG. 2. In such an embodiment, the human user may be remote from the computer system 10. The computer system 10 displays speech signals over the outbound data stream 58, which is a telephone line. The user responds by speaking into the microphone 46 or the telephone handset 36. The user's speech signal is transmitted over the phone line 50, and processed by the speech recognizer 44, with reference to the current state of the application interface, as received in data stream 55 from the application interface controller 34.

The speech recognizer 44 produces a data stream 52 that contains an augmented representation of the linguistic content of the user's speech signal, including a representation of the speech signal aligned with segment, syllable, word, phrase, and clause units. The semaphore logic 42 is implemented as a sequentially separate processing component in the embodiment shown in FIG. 2, although its function may also be performed in whole or in part in the speech recognizer 44. The semaphore logic 42 extracts a series of nominal and numerical values that are associated with each unit level. This embedded semaphore structure is data stream 54 that is stored in application interface controller 34 and combined in various forms to drive the branching decisions and determine the state of the application interface controller 34. The state of the application interface controller 34 then generates two data streams: 56 that updates ASR 44 and semaphore logic 42 with its current state as relevant to the processing done in ASR 44 and semaphore logic 42, and 58 that is the audio signal that plays out through the loudspeaker 40 or the user's telephone handset 36.

Figure 3:
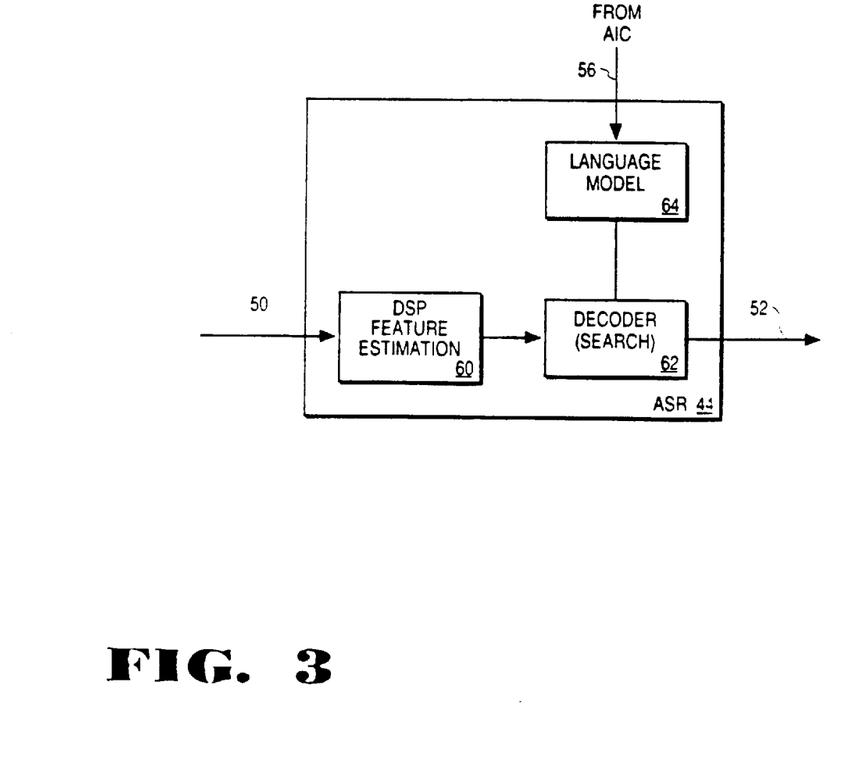
FIG. 3 shows a block diagram of the automatic speech recognition component system according to one embodiment of the invention.

FIG. 3 is a block diagram of one embodiment of a speech recognizer 44. Speech recognizer 44 is consistent with an Hidden Markov Model (HMM)-based system for this embodiment, although the invention is applicable to systems that use other speech recognition techniques. The component comprises a feature extractor 60 that is implemented by digital signal processing techniques well known in the art and a decoder 62 that searches the language model 64 as appropriate to the current state of the application interface controller 34.

The techniques required to implement an HMM-based speech recognizers are well known in the art. For example, U.S. Pat. No. 5,268,990 to Cohen, et al. describes such a system wherein words are modeled as probabilistic networks of phonetic segments, each being represented as a context-independent hidden Markov phone model mixed with a plurality of context-dependent phone models. Such speech recognizers sample and process the input speech to derive a number of spectral features. Such processing is accomplished using code books techniques familiar to those skilled in the art. Recognition of the speech then is achieved by solving for the state sequence that is most likely to have produced the input features.

Figure 4:
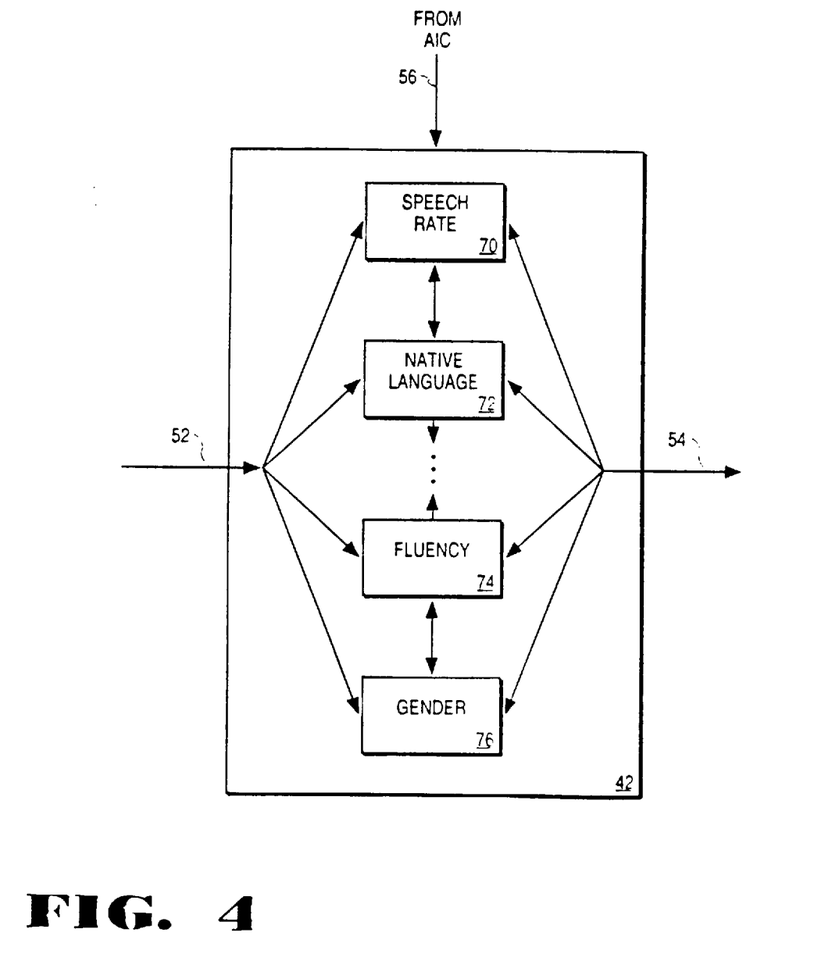
FIG. 4 shows a schematic block diagram of the logic used in constructing the semaphore fields for one embodiment of the present invention.

FIG. 4 is a schematic block diagram of the semaphore logic 42, which operates on the data stream 52 and produces the data stream 53. Semaphore logic 42 implements a set of estimation routines 70-76 that logically operate in parallel, with partial inter-process communication. These processes include, in the embodiment for telephone language proficiency testing, measures of speaking rate and of fluency, estimates of speaker gender and native language, and measures of segmental and prosodic accuracy for the spoken response. Each of these processes is implemented using programming techniques well known in the art.

Figure 5:
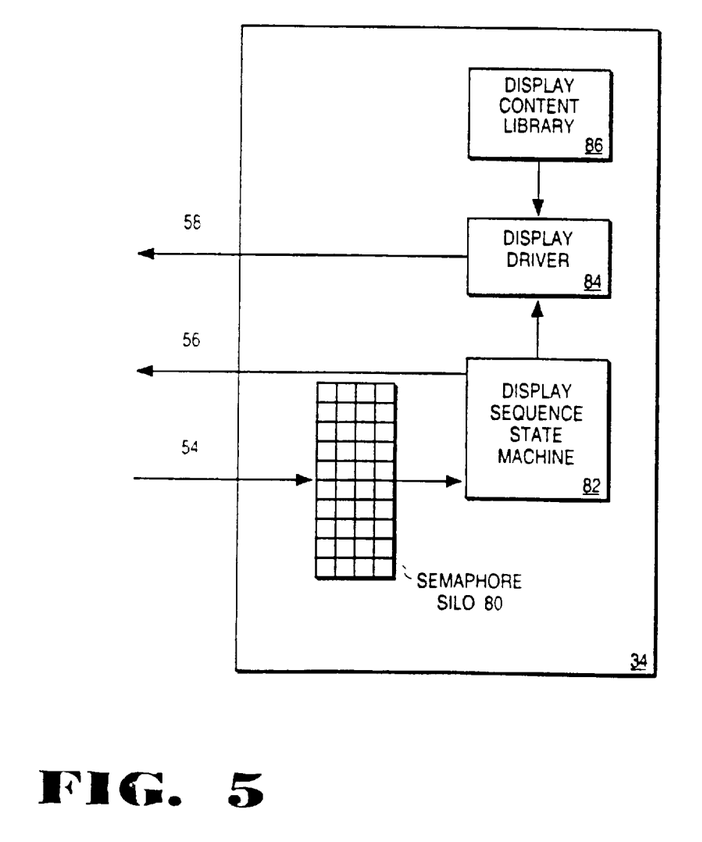
FIG. 5 shows a schematic block diagram of one embodiment of the application display controller.

FIG. 5 is a block diagram of the application interface controller 34 which comprises a semaphore silo 80, which stores a 10-utterance FIFO of semaphores, a display sequence state machine 82, a display driver 84, and a display content library 86 containing the audio files specified for display by the display sequence state machine 82. Display sequence state machine 82 changes state depending on the content of the semaphore silo 80. The current state of display sequence state machine 82 generates data stream 56 and controls the display driver 84, which copies or adapts content from display content library 86 and produces data stream 58.

Figure 6:
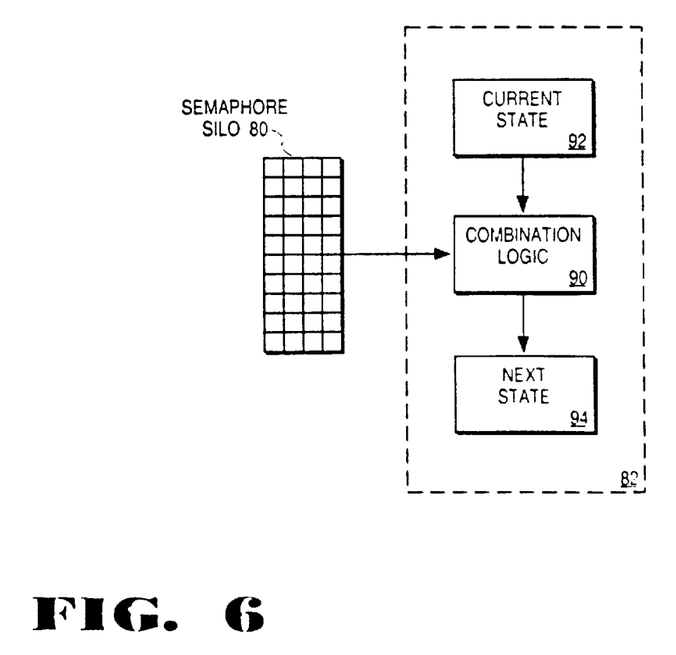
FIG. 6 is a flow diagram representing the conjoint use of semaphore fields in changing application display states.

FIG. 6 represents a decision logic element in the state network implemented in the display sequence state machine 82. The combination logic 90 in this embodiment is a deterministic, state-dependent function of the last semaphore value. Combination logic 90 allows display sequence state machine 82 to transition from current state 92 to next state 94 based on the input from semaphoric silo 80. Other possibilities within the scope of the invention include probabilistic functions of the last semaphore values, and probabilistic or deterministic functions on the values of the last n (n<11) semaphores.

According to one embodiment of the present invention, a remote user initiates contact with computer system 10 via a standard telephone handset 36. It will be appreciated that this can be accomplished by dialing up a telephone number associated with computer system 10 whereupon the user's call will be automatically answered. The user initiates the operation of a desired speech testing or other routine in the typical fashion, for example, by responding to audio prompts using the touch-tone keypad of the telephone. In response to the user input, computer system 10 loads the desired application program from hard drive 16 into main memory 14 and begins to execute the instructions associated therewith. This further causes computer system 10 to configure its circuitry accordingly so as to implement the operation of the selected application program.

Once operation has commenced, computer system 10 begins testing the user's speech abilities by generating a series of displays. These displays may be purely audio, i.e., in the case of a solely telephone contact by the user, or audio-visual, where the user is positioned at a remote terminal or has accessed computer system 10 via a modem. It will be appreciated that one method of accessing computer system 10 may be via a gateway to the network of computer systems commonly referred to as the Internet.

Regardless of the method of connection, the displays initiated by computer system 10 may take the form of a request to read or repeat a word, phrase, or sentence (or larger linguistic unit); a request to complete, fill in, or identify missing elements in a graphic or verbal aggregate (i.e., a picture or a paragraph); example to imitate; or any similar graphical or verbal presentation that conveniently serves as a prompt for the user to speak. In response to this prompt, the user provides a speech signal which is transmitted via the telephone handset 36 (or other device) to ASR 44.

As described above, the user's speech signal is processed by ASR 44 to produce data stream 52. This information (data stream 52) is passed on to semaphore logic 42 where the above-described processes operate to extract linguistic and extra-linguistic information. For example, in one embodiment, the response latency and speaking rate of the user is identified. Other embodiments might extract gender and native language information.

This extracted information is then utilized by application interface 34 to select the subsequent output of computer system 10. In the context of a language test, this might include displaying advanced graphical or verbal aggregates to those users whose speech characteristics demonstrate a high level of fluency. Of course, it will be appreciated that other implementations of the present invention may have targets other than language proficiency. For example, geographical familiarity or competency in arithmetic could be examined. Also, the present invention could be used as a means by which users interact with an amusement game running on computer system 10.

Thus, a novel computer implemented method and apparatus for combining information from speech signals for adaptive interaction has been described. Although the teachings have been presented in connection with a particular circuit embodiment, it should be understood that the method of the present invention is equally applicable to a number of systems. Therefore, the disclosure should be construed as being exemplary and not limiting and the scope of the invention should be measured only in terms of the appended claims.

What is claimed is:

1. A computer-assisted method, comprising selecting a next prompt for presentation to a user based at least in part on one or more extra-linguistic measures estimated from one or more spoken responses received from the user in response to one or more prior prompts, the extra-linguistic measures being chosen from a group including the latency of the spoken response, the amplitude of the spoken response and fundamental frequency values of the spoken response.

2. The computer-assisted method of claim 1 wherein the next prompt is selected based at least in part on the one or more extra-linguistic measures and one or more prosodic measures estimated from the one or more spoken responses, the prosodic measures being chosen from a group including the rate of speech of the user during the period of the spoken response and the fluency of the spoken response.

3. The computer-assisted method of claim 2 wherein the next prompt is selected based at least in part on the extra-linguistic and prosodic measures and one or more indexical values, the indexical values being chosen from a group including speaker identity, speaker native language, speaker age, and speaker gender, the indexical values being estimated from the one or more spoken responses or directly provided by the user.

4. The computer-assisted method of claim 3 wherein the next prompt is selected based at least in part on the extra-linguistic measures, prosodic measures and indexical values and one or more production quality measures estimated from the one or more spoken responses, the production quality measures from a group including the pronunciation quality of the spoken response.

5. The computer-assisted method of claim 4 wherein the next prompt is selected based at least in part on the indexical values, the extra-linguistic, prosodic, and production quality measures and the identity of one or more linguistic units which comprise the one or more spoken responses.

6. The computer-assisted method of claim 3 wherein the next prompt is selected based at least in part on the extra-linguistic measures, prosodic measures and indexical values and the identity of one or more linguistic units which comprise the one or more spoken responses.

7. The computer-assisted method of claim 2 wherein the next prompt is selected based at least in part on the extra-linguistic and prosodic measures and one or more production quality measures estimated from the one or more spoken responses, the production quality measures being chosen from a group including the pronunciation quality of the spoken response.

8. The computer-assisted method of claim 2 wherein the next prompt is selected based at least in part on the extra-linguistic and prosodic measures and the identity of one or more linguistic units which comprise the one or more spoken responses.

9. The computer-assisted method of claim 1 wherein the next prompt is selected based at least in part on the one or more extra-linguistic measures and one or more indexical values, the indexical values being chosen from a group including speaker identity, speaker native language, speaker age, and speaker gender, the indexical values being estimated from the one or more spoken responses or directly provided by the user.

10. The computer-assisted method of claim 1 wherein the next prompt is selected based at least in part on the one or more extra-linguistic measures and one or more production quality measures estimated from the one or more spoken responses, the production quality measures being chosen from a group including the pronunciation quality of the spoken response.

11. The computer-assisted method of claim 1 wherein the next prompt is selected based at least in part on the one or more extra-linguistic measures and the identity of one or more linguistic units which comprise the one or more spoken responses.

12. The computer-assisted method of claim 1 wherein the next prompt comprises at least one of: a request for information; a request to read a linguistic unit; a request to repeat a linguistic unit; or a request to complete, fill in or identify a verbal aggregate.

13. The computer-assisted method of claim 1 wherein the one or more spoken responses from the user are received at an interactive computer system via telephone or other telecommunication or data information network.

14. The computer-assisted method of claim 1 wherein the next prompt comprises at least one of: a graphical prompt, an audio prompt, or a combination of verbal and graphical elements.

15. A computer-assisted method, comprising selecting a next prompt for presentation to a user based at least in part on a value of the user's native language, age or gender as estimated at least in part from one or more spoken responses of the user to one or more prior prompts.

16. The computer-assisted method of claim 15 wherein the next prompt comprises at least one of: a request for information; a request to read a linguistic unit; a request to repeat a linguistic unit; or a request to complete, fill in or identify a verbal aggregate.

17. The computer-assisted method of claim 15 wherein the user's spoken responses are received at an interactive computer system via telephone or other telecommunication or data information network.

18. The computer-assisted method of claim 15 wherein the next prompt comprises at least one of: a graphical prompt, an audio prompt, or a combination of verbal and graphical elements.

19. The computer-assisted method of claim 15 wherein the next prompt is further selected based at least in part on one or more measures of extra-linguistic, prosodic or production quality measures or linguistic units estimated from the one or more spoken responses, and the user's identity estimated from the one or more spoken responses or provided directly by the user.

20. A computer-assisted method, comprising selecting a next prompt for presentation to a user based at least in part on prosodic measures estimated from one or more spoken responses received from the user in response to one or more prior prompts and indexical values, the prosodic measures being chosen from a group including the rate of speech of the user during the period of the spoken response and the fluency of the spoken response, and the indexical values being chosen from a group including user identity, user native language, user age, and user gender, the indexical values being estimated from the one or more spoken responses or directly provided by the user.

21. The computer-assisted method of claim 20 wherein the next prompt comprises at least one of: a request for information; a request to read a linguistic unit; a request to repeat a linguistic unit; or a request to complete, fill in or identify a verbal aggregate.

22. The computer-assisted method of claim 20 wherein the spoken responses from the user are received at an interactive computer system via telephone or other telecommunication or data information network.

23. The computer-assisted method of claim 20 wherein the next prompt comprises at least one of: a graphical prompt, an audio prompt, or a combination of verbal and graphical elements.

24. A computer-assisted method, comprising estimating skills, traits or states of a user from extra-linguistic measures derived from one or more spoken responses received from the user in response to one or more prompts, the extra-linguistic measures being chosen from a group including the latency of at least one of the spoken responses, the amplitude of at least one of the spoken responses and fundamental frequency values of at least one of the spoken responses.

25. The computer-assisted method of claim 24 wherein the skills, traits or states are chosen from a group including language proficiency, subject matter skill, cognitive skill, verbal skill and vocal skill.

26. The computer-assisted method of claim 25 wherein at least one of the prompts comprises at least one of: a request for information; a request to read a linguistic unit; a request to repeat a linguistic unit; or a request to complete, fill in or identify a verbal aggregate.

27. The computer-assisted method of claim 25 wherein the spoken responses from the user are received at an interactive computer system via telephone or other telecommunication or data information network.

28. The computer-assisted method of claim 25 wherein at least one of the prompts comprises at least one of: one or more graphical prompts, one or more audio prompts, or a combination of verbal and graphical elements.

29. The computer-assisted method of claim 24 wherein the skills, traits or states are estimated from the one or more extra-linguistic measures and one or more prosodic measures derived from the one or more spoken responses, the prosodic measures being chosen from a group including the rate of speech of the user during the period of the spoken response and the fluency of the spoken response.

30. The computer-assisted method of claim 29 wherein the skills, traits or states are estimated from the extra-linguistic and prosodic measures and one or more indexical values, the indexical values being chosen from a group including speaker identity, speaker native language, speaker age, and speaker gender, the indexical values being estimated from the one or more spoken responses or directly provided by the user.

31. The computer-assisted method of claim 30 wherein the skills, traits or states are estimated from the extra-linguistic measures, prosodic measures and indexical values and one or more production quality measures derived from the one or more spoken responses, the production quality measures from a group including the pronunciation quality of the spoken response.

32. The computer-assisted method of claim 30 wherein the skills, traits or states are estimated from the extra-linguistic measures, prosodic measures and indexical values and the identity of one or more linguistic units which comprise the one or more spoken responses.

33. The computer-assisted method of claim 32 wherein the skills, traits or states are estimated from the indexical values, the extra-linguistic, prosodic, and production quality measures and the identity of one or more linguistic units which comprise the one or more spoken responses.

34. The computer-assisted method of claim 29 wherein the skills, traits or states are estimated from the extra-linguistic and prosodic measures and one or more production quality measures derived from the one or more spoken responses, the production quality measures being chosen from a group including the pronunciation quality of the spoken response.

35. The computer-assisted method of claim 29 wherein the skills, traits or states are estimated from the extra-linguistic and prosodic measures and the identity of one or more linguistic units which comprise the one or more spoken responses.

36. The computer-assisted method of claim 24 wherein the skills, traits or states are estimated from the one or more extra-linguistic measures and one or more indexical values, the indexical values being chosen from a group including speaker identity, speaker native language, speaker age, and speaker gender, the indexical values being estimated from the one or more spoken responses or directly provided by the user.

37. The computer-assisted method of claim 24 wherein the skills, traits or states are estimated from the one or more extra-linguistic measures and one or more production quality measures derived from the one or more spoken responses, the production quality measures being chosen from a group including the pronunciation quality of the spoken response.

38. The computer-assisted method of claim 24 wherein the skills, traits or states are estimated from the one or more extra-linguistic measures and the identity of one or more linguistic units which comprise the one or more spoken responses.

39. A computer-assisted method, comprising using one or more semaphore values measured from one or more spoken responses of a user received in response to one or more prompts to select extra-linguistic characteristics, prosodic characteristics, indexical values or production quality characteristics with which to present linguistic units in a next prompt, the extra-linguistic characteristics being chosen from a group including the latency of the spoken response, the amplitude of the spoken response and fundamental frequency values of the spoken response, the prosodic characteristics being chosen from a group including the rate of speech of the user during the period of the spoken response and the fluency of the spoken response, the indexical values being chosen from a group including speaker identity, speaker native language, speaker age, and speaker gender, and the production quality characteristics being chosen from a group including the pronunciation style or quality of the spoken response.

40. The computer-assisted method of claim 39 wherein the semaphore values comprise at least one of: extra-linguistic measures, prosodic measures, indexical values, production quality measures or linguistic units.

41. The computer-assisted method of claim 39 wherein the next prompt comprises at least one of: a graphical prompt, an audio prompt, or a combination of verbal and graphical elements.

42. The computer-assisted method of claim 39 wherein the next prompt comprises at least one of: a request to repeat a linguistic unit; a request to complete, fill in or identify a verbal aggregate; a request to read a linguistic unit; or a request for information.

43. An interactive computer-based system wherein spoken responses are elicited from a user in response to prompts presented by the system, the system comprising:
  a) means for extracting linguistic, indexical, or paralinguistic values in the user's spoken response; and
  b) means for automatically selecting a next prompt to be presented to the user according to combined values of (i) linguistic units, including words, phrases or sentences contained in the response and (ii) a latency of the spoken response relative to the prompt.

44. The system of claim 43 wherein the means for extracting indexical or paralinguistic values comprises means for extracting semaphore values including speaker identity, fundamental frequency values, speech signal amplitudes, pronunciation quality, fluency, speech rate, speaker native language, speaker age or speaker gender from the user's spoken responses.

45. The system of claim 44 wherein the means for automatically selecting the next prompt comprises means for combining (a) one or more of the extracted semaphore values from the user's spoken responses with (b) a measure of the latency of the user's response and with (c) the linguistic units of a previous response to select the next prompt.

46. The system of claim 44 wherein the means for automatically selecting the next prompt comprises means for estimating a user state by combining two or more of the extracted semaphore values to select the next prompt.

47. The system of claim 44 wherein the means for automatically selecting the next prompt further comprises means for estimating a user skill or trait by combining two or more of the extracted semaphore values to select the next prompt.

48. The system of claim 47 wherein the user skill or trait comprises at least one of: language proficiency, subject matter knowledge, user age or user gender.

49. The system of claim 48 further comprising means for selecting the linguistic, paralinguistic or indexical characteristics of the prompt, at least in part, by the linguistic, paralinguistic or indexical content of a spoken response from the user.

50. The system of claim 44 wherein the linguistic, paralinguistic or indexical characteristics of the prompt presented include linguistic units, latency relative to the user's response, speech rate, fundamental frequency values, speech signal amplitudes, pronunciation quality, fluency, speaker identity, speaker age or speaker gender.

51. The system of claim 44 wherein the prompt comprises a request for information.

52. The system of claim 44 wherein the prompt comprises a request to read a linguistic unit.

53. The system of claim 44 wherein the prompt comprises a request to repeat a linguistic unit.

54. The system of claim 44 wherein the prompt comprises a request to complete, fill in or identify a verbal aggregate.

55. The system of claim 43 wherein the means for extracting indexical or paralinguistic values comprises means for extracting semaphore values including user's native language derived from the user's spoken responses in a target language.

56. The system of claim 43 wherein the spoken responses from the user are received at the interactive computer system via telephone or other telecommunication or data information network.

57. The system of claim 43 wherein the prompts are graphical prompts.

58. The system of claim 43 wherein the prompts are audio prompts.

59. The system of claim 43 wherein the prompts combine verbal and graphical elements.

* * * * *